US012482589B2

(12) United States Patent
Hsieh et al.

(10) Patent No.: US 12,482,589 B2
(45) Date of Patent: Nov. 25, 2025

(54) MAGNETIC ELEMENT

(71) Applicant: Delta Electronics, Inc., Taoyuan (TW)

(72) Inventors: Yueh-Cheng Hsieh, Taoyuan (TW); Zengyi Lu, Taoyuan (TW); Te-Chih Peng, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 1014 days.

(21) Appl. No.: 17/539,993

(22) Filed: Dec. 1, 2021

(65) Prior Publication Data

US 2023/0083589 A1 Mar. 16, 2023

(30) Foreign Application Priority Data

Sep. 16, 2021 (CN) ......................... 202111085268.6

(51) Int. Cl.
*H01F 27/24* (2006.01)
*H01F 27/30* (2006.01)

(52) U.S. Cl.
CPC ........... *H01F 27/24* (2013.01); *H01F 27/306* (2013.01)

(58) Field of Classification Search
CPC ............................... H01F 27/24; H01F 27/306
See application file for complete search history.

(56) References Cited

U.S. PATENT DOCUMENTS 10,937,581 B2 3/2021 Kim et al.
D979,505 S * 2/2023 Buono .................... H01F 27/02 D13/117
2007/0159289 A1* 7/2007 Lee ......................... H01F 27/24 336/212
2018/0308615 A1* 10/2018 Tsai ........................ H01F 27/24
2018/0315542 A1* 11/2018 Hayashi .................. H01F 27/29

FOREIGN PATENT DOCUMENTS

| | | | |
|---|---|---|---|
| CN | 102594107 | A | 7/2012 |
| CN | 104021920 | A | 9/2014 |
| CN | 106158245 | B | 7/2019 |
| CN | 212750576 | * | 3/2021 |
| TW | M529255 | U | 9/2016 |
| TW | I566264 | B | 1/2017 |
| TW | I603349 | B | 10/2017 |

* cited by examiner

*Primary Examiner* — Malcolm Barnes
(74) *Attorney, Agent, or Firm* — KIRTON McCONKIE; Evan R. Witt

(57) ABSTRACT

A magnetic element is provided and includes a first magnetic core, a second magnetic core and two windings. The first magnetic core is made of a first material and includes two winding pillars and two connecting parts. The first magnetic core has a first permeability. The second magnetic core is made of a second material and has a second permeability. The first permeability is less than the second permeability. When the current flows through the two windings, a closed magnetic path is generated in the first magnetic core, the magnetic flux generated by the closed magnetic path flows through one of the winding pillars, one of the connecting parts, the other one of the winding pillars and the other one of the connecting parts in a direction, and the magnetic fluxes generated on the second magnetic core are cancelled out by each other.

10 Claims, 10 Drawing Sheets

100

MAGNETIC ELEMENT

CROSS-REFERENCE TO RELATED APPLICATION

This application claims priority to China Patent Application No. 202111085268.6, filed on Sep. 16, 2021, the entire contents of which are incorporated herein by reference for all purposes.

FIELD OF THE INVENTION

The present disclosure relates to a magnetic element, and more particularly to a magnetic element for interleaved parallel circuit.

BACKGROUND OF THE INVENTION

The conventional power supply has increasingly strict requirements on power efficiency. Further, in 2023, 80 PLUS titanium efficiency specifications will be introduced to improve energy efficiency.

For the magnetic element used in the conventional power supply, the winding pillars and the center pillar are alloys of the same material. Therefore, when the current flows through the windings on the two winding pillars, the magnetic flux generated on the center pillar are superimposed. The causing loss of the magnetic element is increased, and the conversion efficiency is decreased.

Therefore, there is a need of providing a magnetic element to obviate the drawbacks encountered from the prior arts.

SUMMARY OF THE INVENTION

It is an object of the present disclosure to provide a magnetic element. The first and second magnetic cores of the magnetic element are made by different materials. The second magnetic core contains ferrite material, so the loss of the second magnetic core is relatively low. Therefore, the causing loss of the magnetic element is decreased, and the conversion efficiency is increased.

It is another object of the present disclosure to provide a magnetic element. The directions of the magnetic fluxes generated on the two winding pillars of the first magnetic core are opposite, and the magnetic fluxes generated on the second magnetic core when the current flows through the windings are cancelled out by each other. Therefore, the causing loss of the magnetic element is decreased, and the conversion efficiency is increased.

In accordance with an aspect of the present disclosure, there is provided a magnetic element. The magnetic element includes a first magnetic core, a second magnetic core and two windings. The first magnetic core is made of a first material, the first magnetic core includes two winding pillars parallel to each other and two connecting parts, one of the connecting parts is connected to one end of one of the winding pillars and one end of the other one of the winding pillars respectively, and the other one of the connecting parts is connected to the other end of the one of the winding pillars and the other end of the other one of the winding pillars respectively, and the first magnetic core has a first permeability. The second magnetic core is made of a second material, the second magnetic core has a second permeability, and the first permeability is less than the second permeability. The two windings are wound on the two winding pillars of the first magnetic core respectively, when the current flows through the two windings, a closed magnetic path is generated in the first magnetic core, the magnetic flux generated by the closed magnetic path flows through one of the winding pillars, one of the connecting parts, the other one of the winding pillars and the other one of the connecting parts in a direction, and the magnetic fluxes generated on the second magnetic core are cancelled out by each other. The first material contains an alloy material, and the second material contains a ferrite material.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
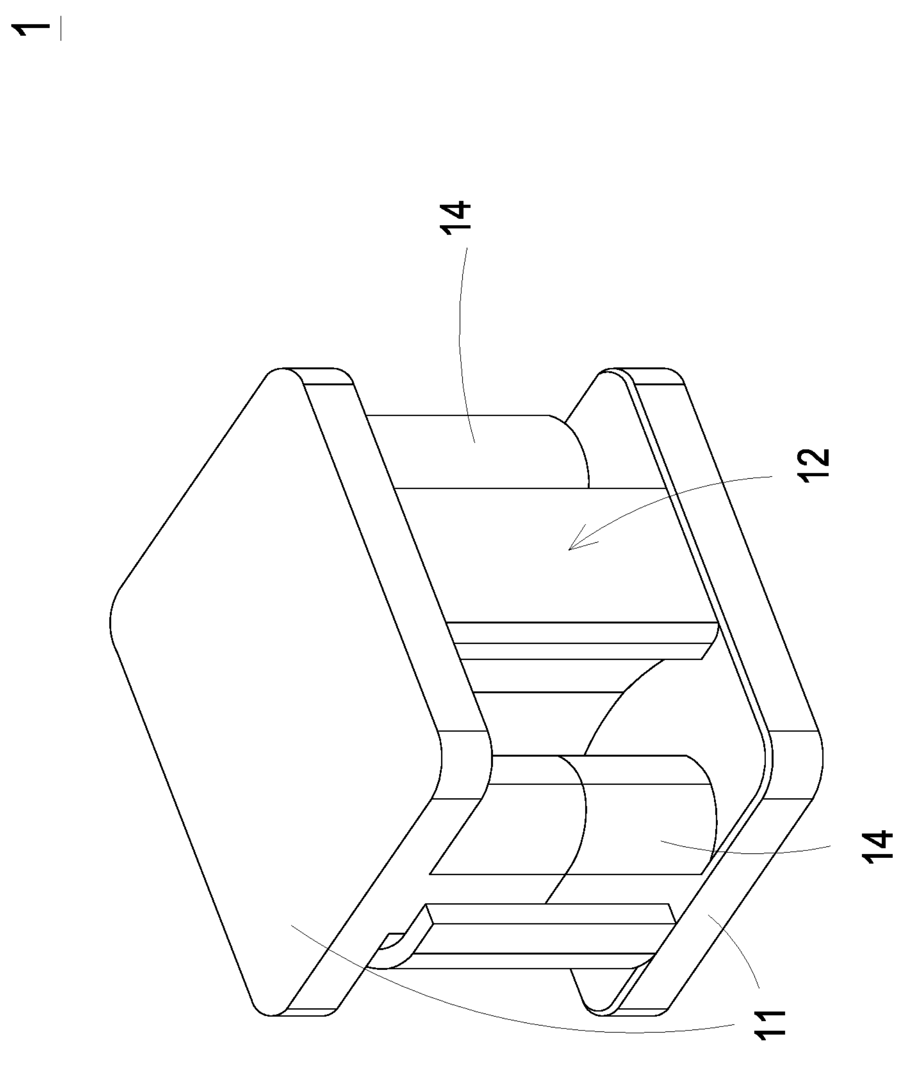
FIG. 1 is a schematic perspective view illustrating a magnetic element according to an embodiment of the present disclosure.
Figure 2:
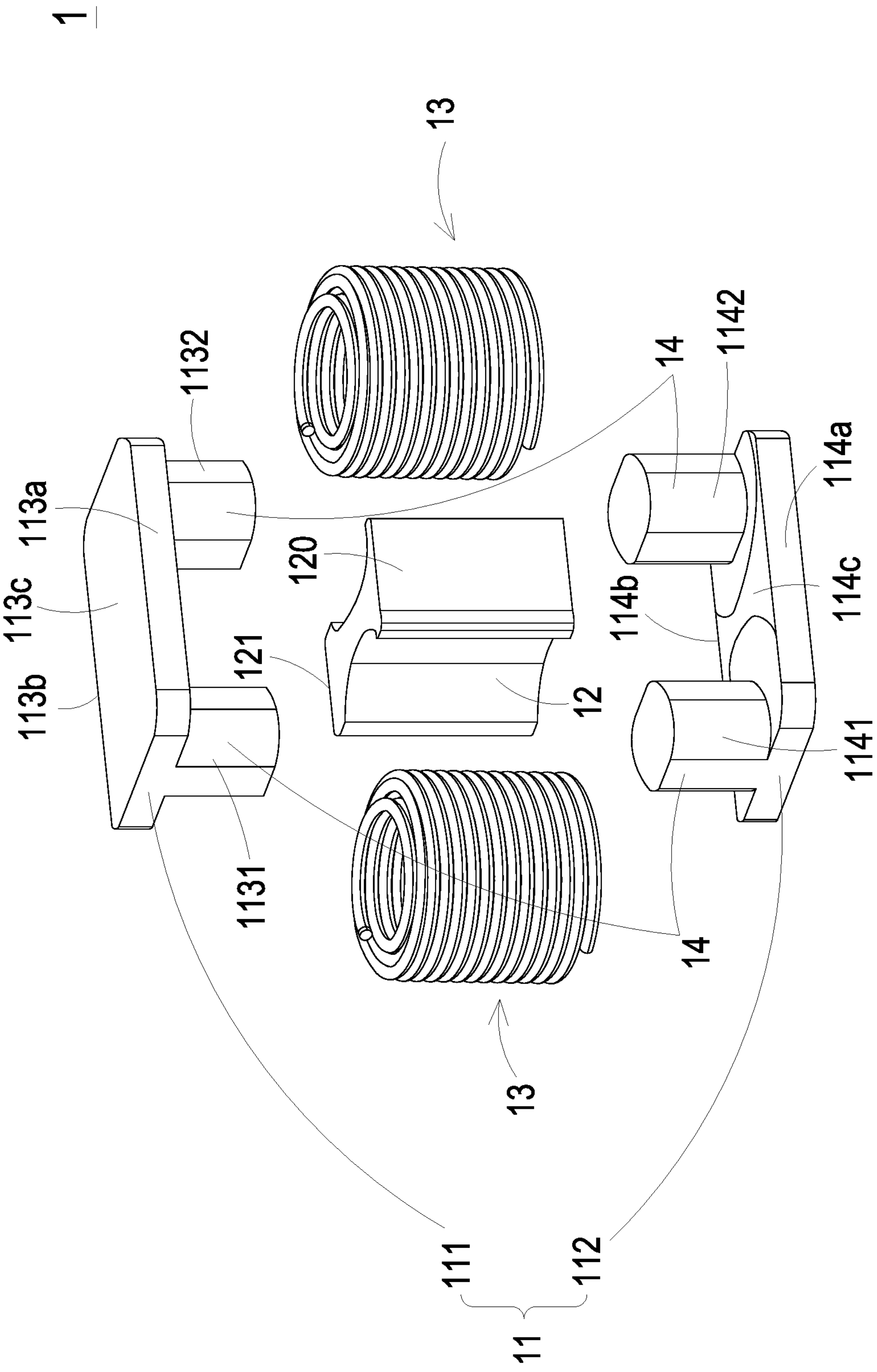
FIG. 2 is an exploded view illustrating the magnetic element of FIG. 1.

FIG. 1 is a schematic perspective view illustrating a magnetic element according to an embodiment of the present disclosure. FIG. 2 is an exploded view illustrating the magnetic element of FIG. 1. As shown in FIGS. 1 and 2, the magnetic element 1 can be applied to an interleaved parallel circuit (not shown), and the magnetic element 1 includes a first magnetic core 11, a second magnetic core 12 and two windings 13. The first magnetic core 11 is made of a first material. The first magnetic core 11 includes two winding pillars 14 parallel to each other and two connecting parts **113*c* and 114*c*. The connecting part 113*c* is connected to two ends of the two winding pillars 14, and the connecting part 114*c* is connected to the other two ends of the two winding pillars 14. The first magnetic core 11 has a first permeability. The second magnetic core 12 is made of a second material and has a second permeability. The first material contains alloy material, and the second material contains a ferrite material. Since the second magnetic core 12 contains the ferrite material, the causing loss of the second magnetic core 12 is decreased, and the conversion efficiency is increased. The first magnetic permeability is smaller than the second magnetic permeability, so the first magnetic core 11 has better anti-saturation ability. The two windings 13 are wound on the two winding pillars 14 of the first magnetic core 11 respectively. In an embodiment, the winding directions of the two windings 13 are clockwise and counterclockwise respectively, or are counterclockwise and clockwise respectively. In an embodiment, the two windings 13 are connected in series. When the current flows through the two windings 13, a closed magnetic path is generated in the first magnetic core 11. The magnetic flux generated by the closed magnetic path flows through one of the winding pillars 14, one of the connecting parts 114***c*, the other one of the winding pillars 14 and the other one of the connecting parts 113*c* in a direction. The direction of the magnetic flux generated on the two winding pillars 14 of the first magnetic core 11 is opposite, and the magnetic fluxes generated on the second magnetic core 12 are cancelled out by each other. Therefore, the causing loss of the magnetic element 1 is decreased, and the conversion efficiency is increased.

The first magnetic core 11 includes a first assembly 111 and a second assembly 112 assembled to each other. The first assembly 111 has a first extension pillar 1131 and a second extension pillar 1132 extending from the connecting part 113*c* of the first assembly 111. The second assembly 112 has a first extension pillar 1141 and a second extension pillar 1142 extending from the connecting part 114*c* of the second assembly 112. The first extension pillar 1131 of the first assembly 111 and the first extension pillar 1141 of the second assembly 112 form one winding pillar 14. The second extension pillar 1132 of the first assembly 111 and the second extension pillar 1142 of the second assembly 112 form the other winding pillar 14. The second magnetic core 12 is an I-type magnetic core. The second magnetic core 12 is partially disposed between the first assembly 111 and the second assembly 112. The bottom side 120 of the second magnetic core 12 is aligned with the first side 113*a* of the first assembly 111 and the first side 114*a* of the second magnetic assembly 112. In other words, the bottom side 120 of the second magnetic core 12, the first side 113*a* of the first assembly 111 and the first side 114*a* of the second assembly 112 are located on the same plane. The top side 121 of the second magnetic core 12 is aligned with the second side 113*b* of the first assembly 111 and the second side 114*b* of the second magnetic assembly 112. In other words, the top side 121 of the second magnetic core 12, the second side 113*b* of the first assembly 111 and the second side 114*b* of the second assembly 112 are located on the same plane. The first side 113*a* and the second side 113*b* of the first assembly 111 are opposite to each other. The first side 114*a* and the second side 114*b* of the second assembly 112 are opposite to each other. In an embodiment, the bottom side 120 of the second magnetic core 12 is protruded related to the first side 113*a* of the first assembly 111 and the first side 114*a* of the second assembly 112, and the top side 121 of the second magnetic core 12 is protruded related to the second side 113*b* of the first assembly 111 and the second side 114*b* of the second assembly 112. In another embodiment, the bottom side 120 of the second magnetic core 12 is concave related to the first side 113*a* of the first assembly 111 and the first side 114*a* of the second assembly 112, and the top side 121 of the second magnetic core 12 is concave related to the second side 113*b* of the first assembly 111 and the second side 114*b* of the second assembly 112. In further another embodiment, the bottom side 120 of the second magnetic core 12 is concave related to the first side 113*a* of the first assembly 111 and the first side 114*a* of the second assembly 112, and the top side 121 of the second magnetic core 12 is protruded related to the second side 113*b* of the first assembly 111 and the second side 114*b* of the second assembly 112. In further another embodiment, the bottom side 120 of the second magnetic core 12 is protruded related to the first side 113*a* of the first assembly 111 and the first side 114*a* of the second assembly 112, and the top side 121 of the second magnetic core 12 is concave related to the second side 113*b* of the first assembly 111 and the second side 114*b* of the second assembly 112.

In an embodiment, the conversion efficiency of the magnetic element 1 refers to the ratio of the output power Po to the input power Pi of the magnetic element 1. Therefore, under the condition of the same input power Pi, if a higher output power Po can be obtained, it means that the conversion efficiency of the magnetic element 1 is improved.

Figure 3:
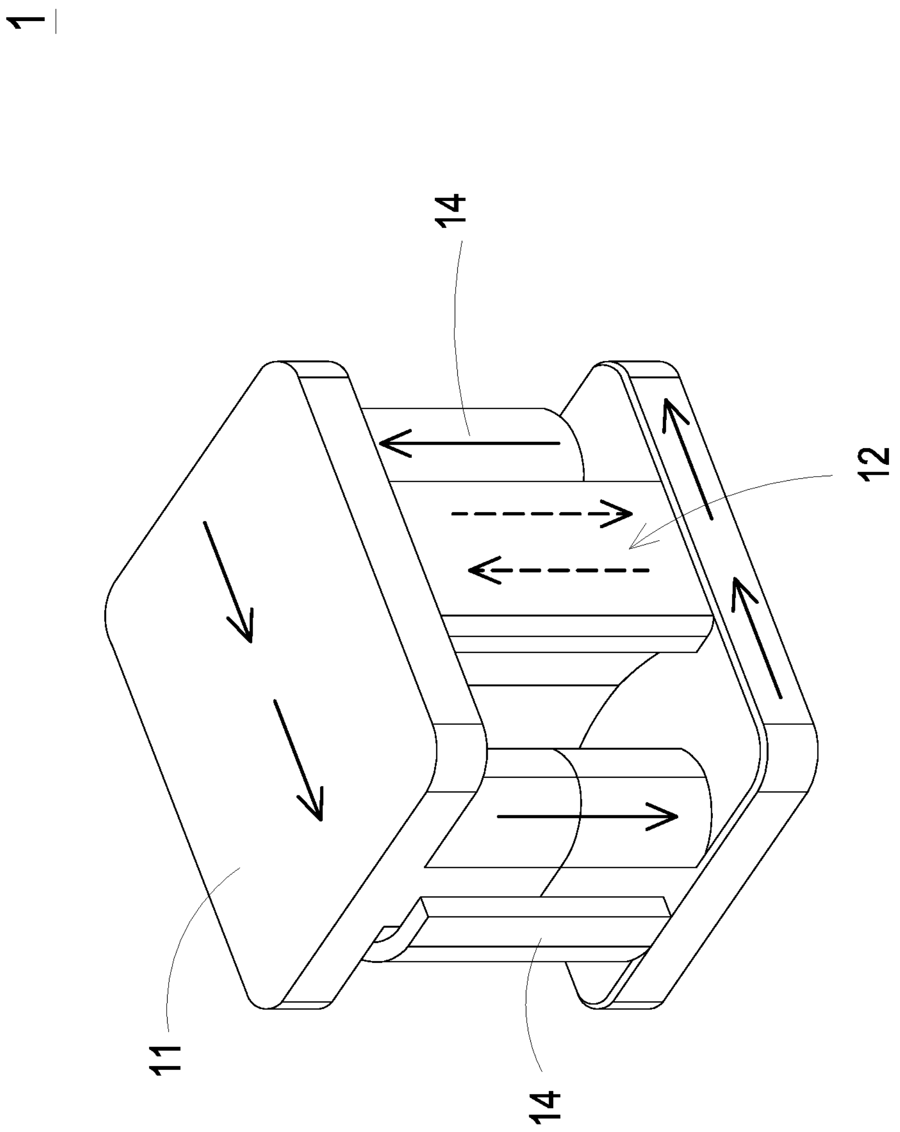
FIG. 3 is a schematic diagram illustrating the magnetic flux direction in the magnetic element of FIG. 1.

Please refer to FIG. 3. FIG. 3 is a schematic diagram illustrating the magnetic flux direction of the magnetic element of FIG. 1. The direction of the magnetic flux is indicated by arrows. It can be seen from FIG. 3 that the magnetic fluxes generated on the second magnetic core 12 are cancelled out by each other, and the magnetic fluxes generated by the current flowing through the two windings 13 flow through the first magnetic core 11.

Figure 4:
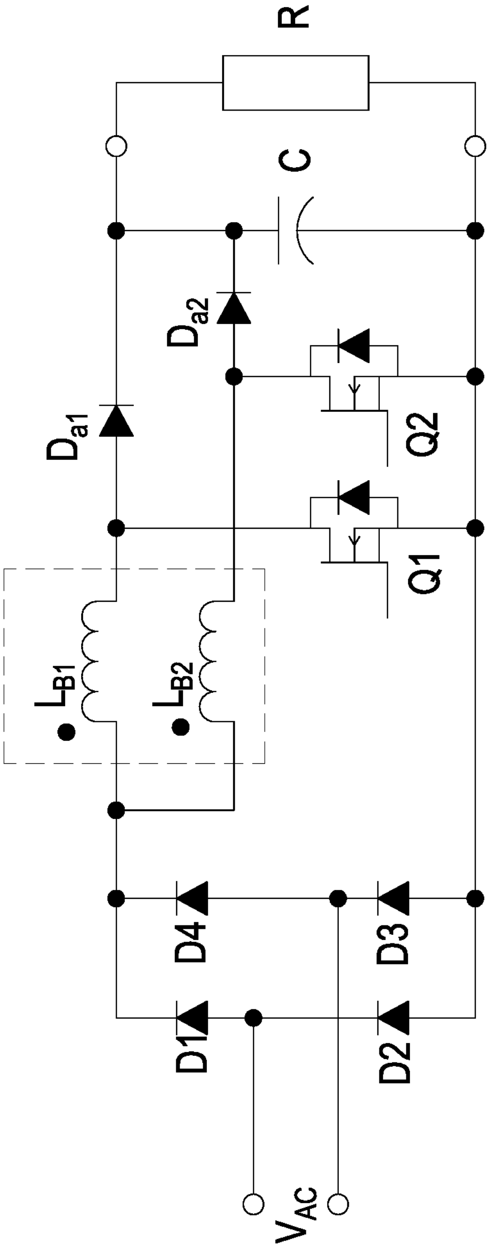
FIG. 4 is a schematic circuit diagram illustrating the magnetic element of FIG. 1 applied to an interleaved parallel circuit.

Please refer to FIG. 4. FIG. 4 is a schematic circuit diagram of the magnetic element 1 of FIG. 1 applied to the interleaved parallel circuit 100. The magnetic element 1 shown in FIG. 1 corresponds to two inductors $L_{B1}$ and $L_{B2}$ in the dashed frame shown in FIG. 4. The switching timings of the switches corresponding to the two inductors $L_{B1}$ and $L_{B2}$ have a phase difference of 180 degrees. The above-mentioned phase difference can be adjusted according to actual needs and is not limited thereto.

Figure 5:
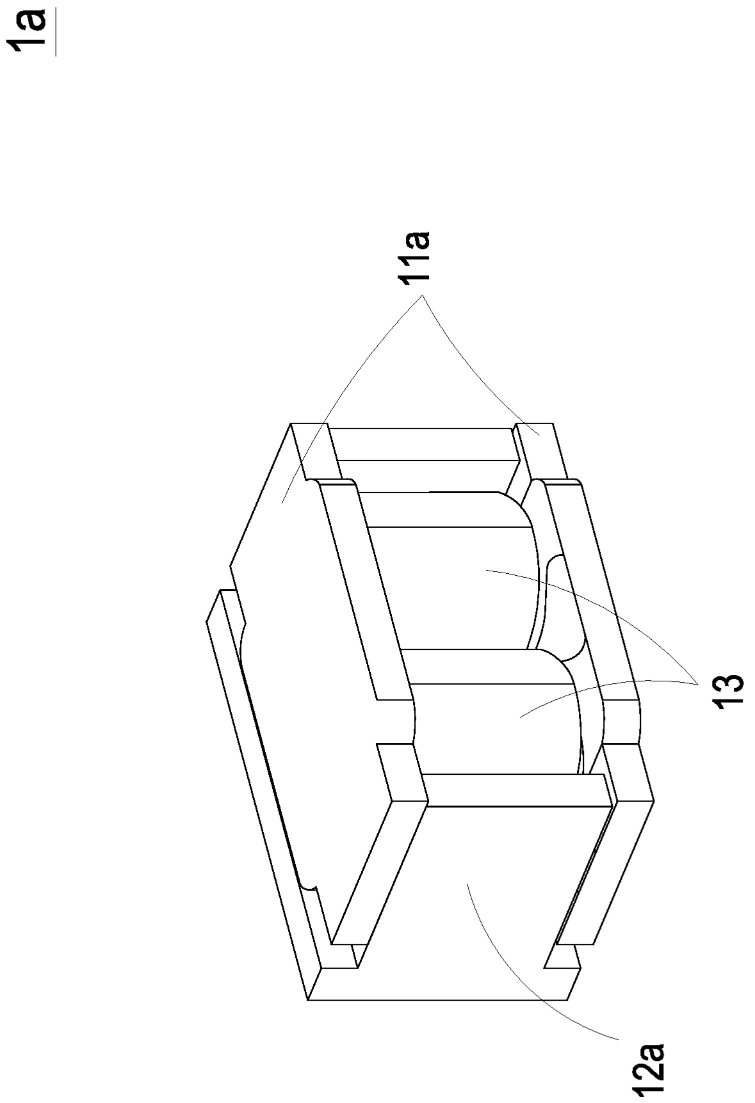
FIG. 5 is a schematic perspective view illustrating a magnetic element according to another embodiment of the present disclosure.
Figure 6:
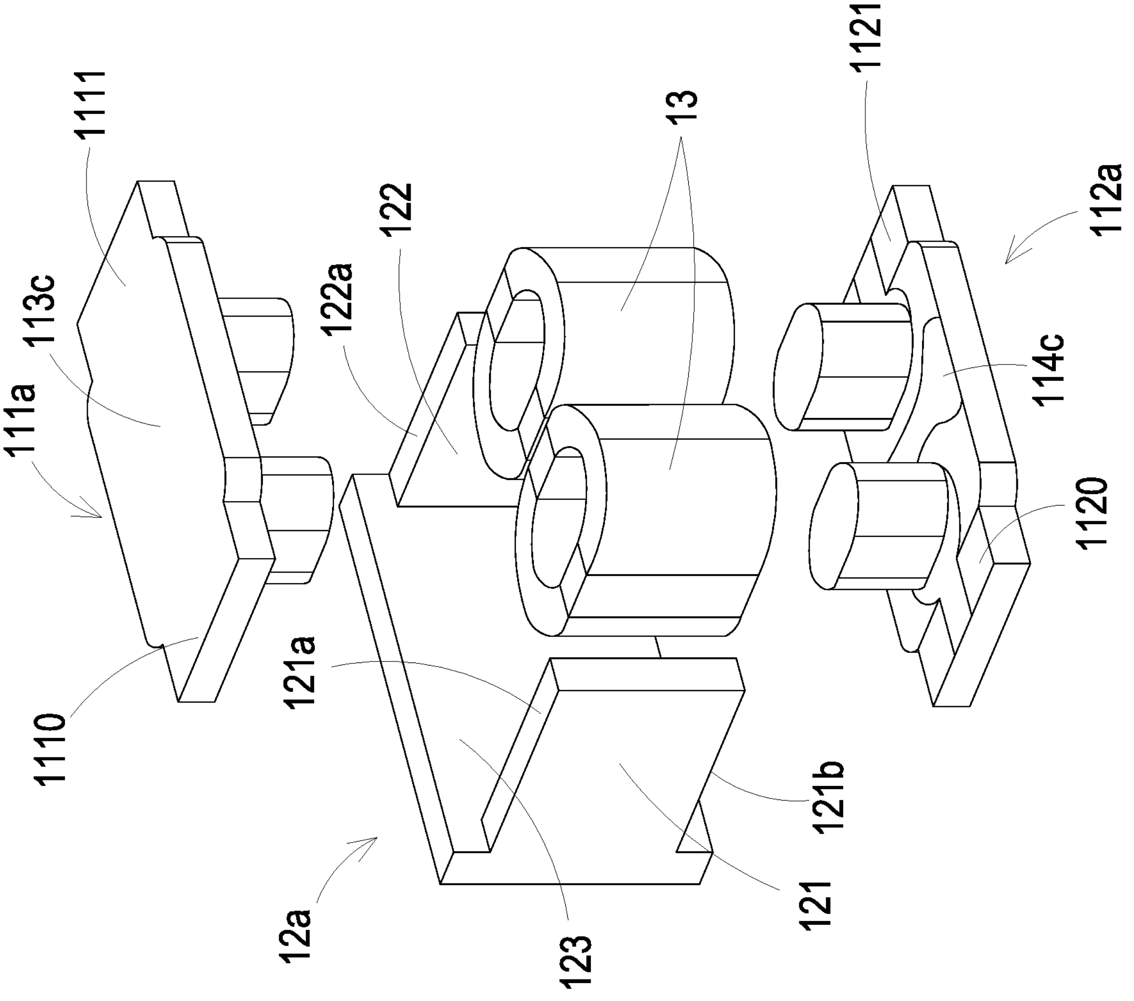
FIG. 6 is an exploded view illustrating the magnetic element of FIG. 5.

In an embodiment, the second magnetic core of the magnetic element is not limited to the aforementioned I-type magnetic core. Please refer to FIGS. 5 and 6. FIG. 5 is a schematic perspective view illustrating a magnetic element 1*a* according to another embodiment of the present disclosure. FIG. 6 is an exploded view illustrating the magnetic element 1*a* of FIG. 5. The elements of FIGS. 5 and 6 that are similar with those of FIGS. 1 and 2 are represented by the same reference numerals, and the detailed description thereof is omitted herein. In this embodiment, the second magnetic core 12*a* is a U-type magnetic core, and the second magnetic core 12*a* has a first section 121, a second section 122 and a third section 123. The first section 121 and the second section 122 are disposed oppositely. The third section 123 is connected between the first section 121 and the second section 122, and a part of the third section 123 is protruded from the first section 121 and the second section 122. The second magnetic core 12*a* is assembled to the first magnetic core 11*a* through the first section 121 and the second section 122. Specifically, the first section 121 has a top side 121*a* and a bottom side 121*b* opposite to each other, and the second section 122 has a top side 122*a* and a bottom side 122*b* opposite to each other. The top side 121*a* of the first section 121 and the top side 122*a* of the second section 122 are assembled to a first protruding part 1110 and a second protruding part 1111 of the first assembly 111*a* respectively. The bottom side 121*b* of the first section 121 and the bottom side 122*b* of the second section 122 are assembled to a first protruding part 1120 and a second protruding part 1121 of the second assembly 112*a* respectively. The first protruding part 1110 and the second protruding part 1111 of the first assembly 111*a* protrude from opposite sides of the connecting part 113*c* of the first assembly 111*a* respectively, that is, the first protruding part 1110 and the second protruding part 1111 extend outward from the two opposite sides of the connecting part 113*c* of the first assembly 111*a* respectively. The first protruding part 1120 and the second protruding part 1121 of the second assembly 112*a* protrude from opposite sides of the connecting part 114*c* of the second assembly 112*a* respectively, that is, the first protruding part 1120 and the second protruding part 1121 extend outward from the two opposite sides of the connecting part 114*c* of the second assembly 112*a* respectively. The first section 121 is connected between the first protruding part 1110 of the first assembly 111*a* and the first protruding part 1120 of the second assembly 112*a*. The second section 122 is connected between the second protruding part 1111 of the first assembly 111*a* and the second protruding part 1121 of the second assembly 112*a*. Therefore, the first magnetic core 11*a* and the second magnetic core 12*a* are assembled to each other. At least a part of the two windings 13 is disposed in the space formed between the first section 121, the second section 122 and the third section 123 of the second magnetic core 12*a*. In this embodiment, the first magnetic core 11*a* and the second magnetic core 12*a* form a special combination structure, and the second magnetic core 12*a* is a U-type magnetic core, thereby increasing the inductance of the magnetic element 1*a*.

Figure 7:
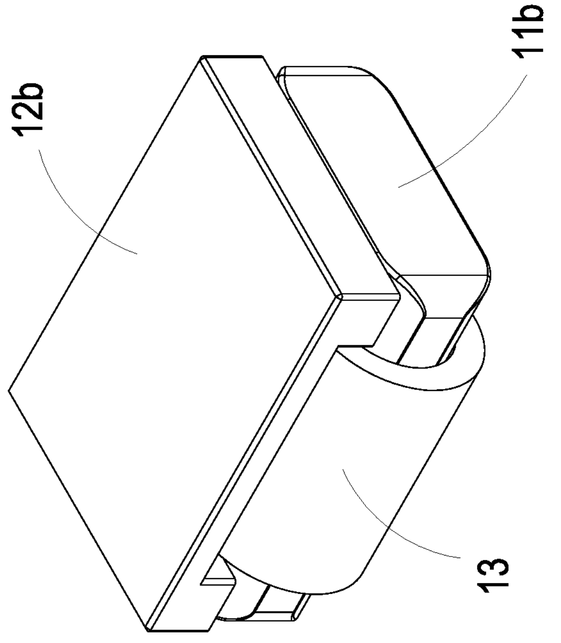
FIG. 7 is a schematic perspective view illustrating a magnetic element according to another embodiment of the present disclosure.
Figure 8:
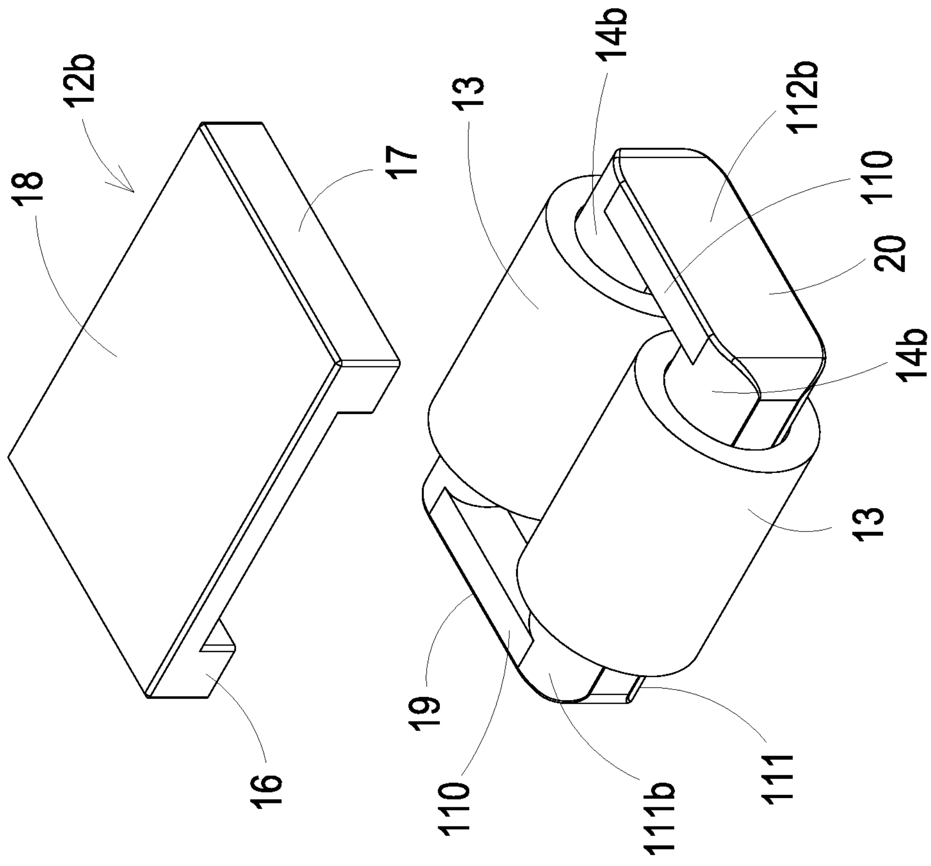
FIG. 8 is an exploded view illustrating the magnetic element of FIG. 7.

In an embodiment, it is not limited to dispose the second magnetic core of the magnetic element in the above-mentioned manner. Please refer to FIGS. 7 and 8. FIG. 7 is a schematic perspective view illustrating a magnetic element 1*b* according to another embodiment of the present disclosure. FIG. 8 is an exploded view illustrating the magnetic element 1*b* of FIG. 7. The elements of FIGS. 7 and 8 that are similar with those of FIGS. 1 and 2 are represented by the same reference numerals, and the detailed description thereof is omitted herein. In this embodiment, the first magnetic core 11*b* is a square-type magnetic and has a first surface 110 and a second surface 111 opposite to each other. The second magnetic core 12*b* is a U-type magnetic core and is disposed on the first surface 110. The two windings 13 are partially disposed between the first magnetic core 11*b* and the second magnetic core 12*b*, and the two windings 13 are wound on the two winding pillars 14*b* of the first magnetic core 11*b* respectively. The second magnetic core 12*b* has a first section 16, a second section 17 and a third section 18. The first section 16 and the second section 17 are oppositely disposed. The third section 18 is connected between the first section 16 and the second section 17. The first section 16 and the second section 17 are assembled to the two connecting parts of the first magnetic core 11*b* respectively. The two windings 13 are partially disposed in a groove of the U-type second magnetic core 12*b*. The groove is a space constructed by the first section 16, the second section 17 and the third section 18 collaboratively. In this embodiment, the first magnetic core 11*b* is a square-type magnetic core, and the second magnetic core 12*b* is a U-type magnetic core. With the combination structure of the first magnetic core 11*b* and the second magnetic core 12*b*, the first magnetic core 11*b* or the second magnetic core 12*b* does not need to be disassembled during the assembly of the magnetic element 1*b*, which makes the assembly of the magnetic element 1*b* more convenient.

In an embodiment, the first assembly 111*b* has a first outer side 19, and the second assembly 112*b* has a second outer side 20. The first outer side 19 and the second outer side 20 are aligned with the outer side of the first section 16 and the outer side of the second section 17 respectively.

In an embodiment, the second magnetic core 12*b* is connected to the first magnetic core 11*b*, that is, the first section 16 and the second section 17 are connected to the first surface 110 of the first magnetic core 11*b*. The first magnetic core 11*b* is partially disposed in the second magnetic core 12*b*.

In an embodiment, the magnetic element includes a first magnetic core 11*b* and two second magnetic cores 12*b*. The two second magnetic cores 12*b* are symmetrically disposed with respect to the first magnetic core 11*b*, and the first magnetic core 11*b* is disposed between the two second magnetic cores 12*b*. The difference from the mentioned embodiment in which the second magnetic core 12*b* is disposed on the first surface 110 shown in FIG. 8 is that the two second magnetic cores 12*b* of this embodiment are disposed on the first surface 110 and the second surface 111 respectively. The first outer side 19 of the first assembly 111*b* and the second outer side 20 of the second assembly 112*b* are aligned with the outer sides of the first sections 16 of the two magnetic cores 12*b* and the outer sides of the second sections 17 of the two magnetic cores 12*b* respectively. Meanwhile, the magnetic fluxes on the two second magnetic cores 12*b* generated by the current flowing through the two windings 13 are cancelled out by each other.

Figure 9:
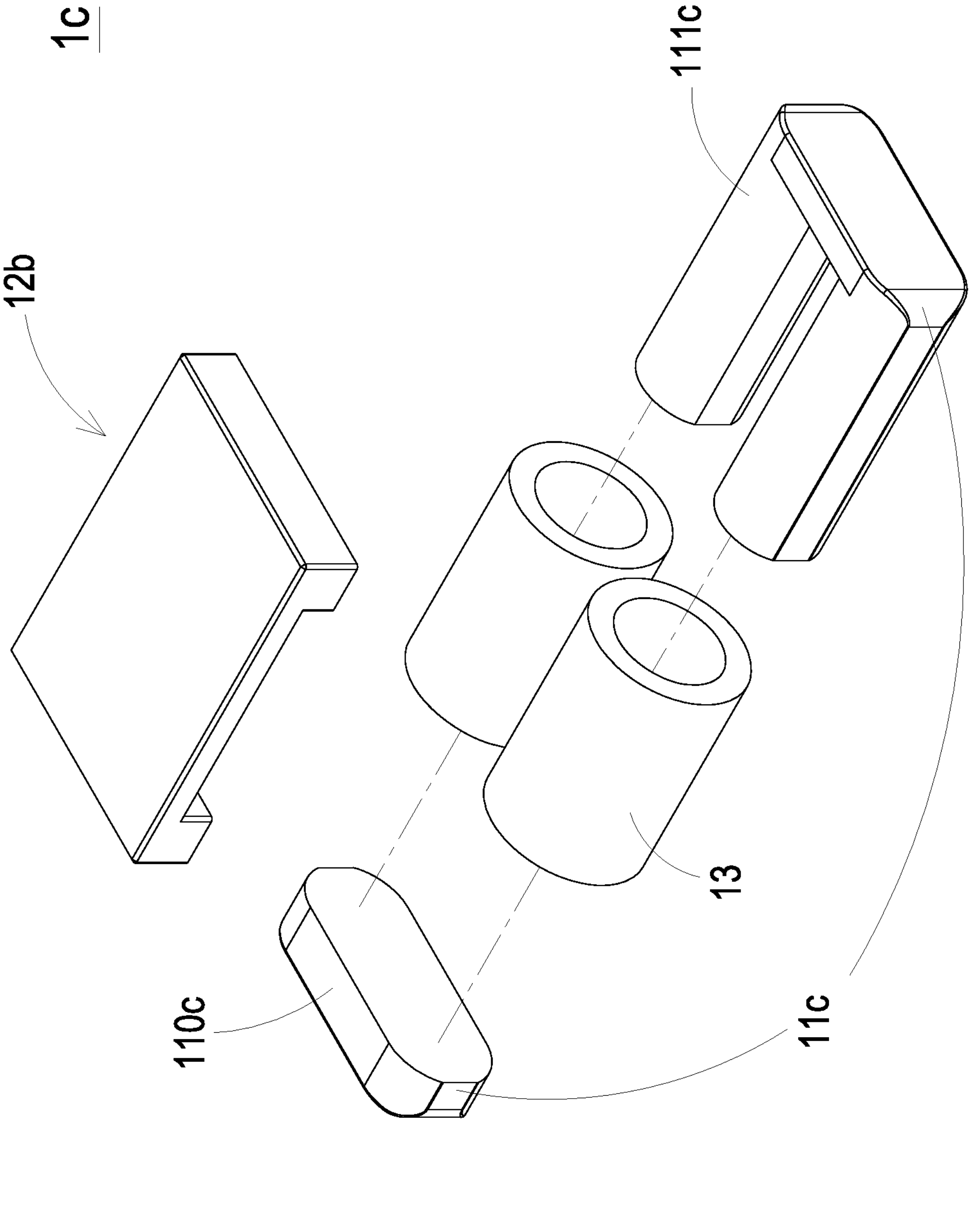
FIG. 9 is an exploded view illustrating a magnetic element according to another embodiment of the present disclosure.
Figure 10:
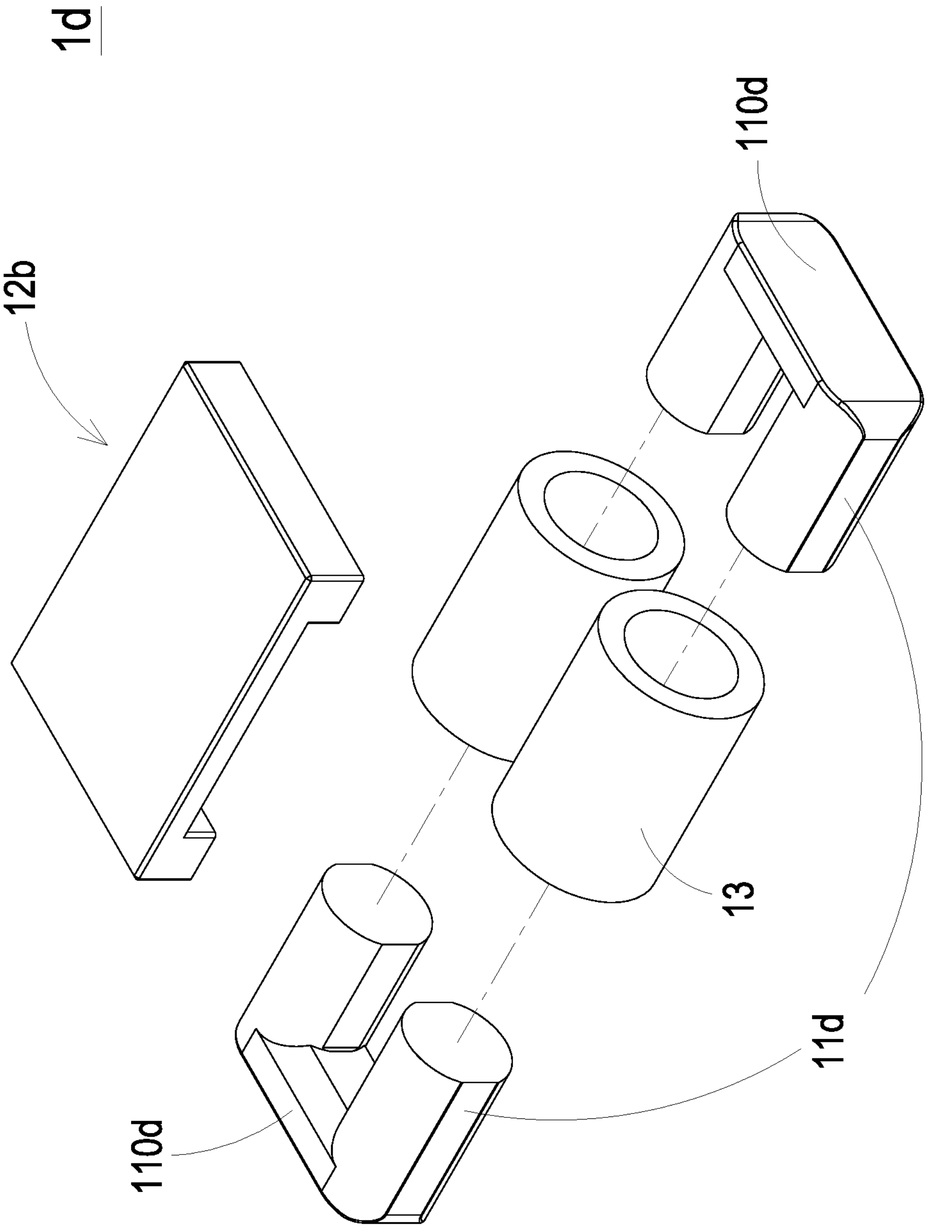
FIG. 10 is an exploded view illustrating a magnetic element according to another embodiment of the present disclosure.

In an embodiment, the square-type first magnetic core is not limited to the one-piece structure shown in FIGS. 7 and 8. The square-type first magnetic core can also be composed of a U-type core and an I-type core or two U-type cores. Please refer to FIGS. 9 and 10. FIG. 9 is an exploded view illustrating a magnetic element 1*c* according to another embodiment of the present disclosure, and FIG. 10 is an exploded view illustrating a magnetic element 1*d* according to another embodiment of the present disclosure. The elements of FIGS. 9 and 10 that are similar with those of FIG. 7 are represented by the same reference numerals, and the detailed description thereof is omitted herein. In the embodiment of FIG. 9, the square-type first magnetic core 11*c* is formed by assembling an I-type magnetic core 110*c* and a U-type magnetic core 111*c*. In the embodiment shown in FIG. 10, the square-type first magnetic core 11*d* is formed by assembling two U-type magnetic cores 110*d*.

From the above descriptions, the present disclosure provides a magnetic element. The first and second magnetic cores of the magnetic element are made by different materials. The second magnetic core contains ferrite material, so the loss of the second core is relatively low. The directions of the magnetic fluxes generated on the two winding pillars of the first magnetic core are opposite, and the magnetic fluxes generated on the second magnetic core when the current flows through the windings are cancelled out by each other. Therefore, the causing loss of the magnetic element is decreased, and the conversion efficiency is increased.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A magnetic element for an interleaved parallel circuit, comprising:

a first magnetic core made of a first material, wherein the first magnetic core comprises two winding pillars, two connecting parts, a first assembly and a second assembly, the two winding pillars are parallel to each other, one of the connecting parts is connected to two ends of the two winding pillars, the other one of the connecting parts is connected to the other two ends of the two winding pillars, the first magnetic core has a first permeability, and the first assembly and the second assembly are assembled to each other;

a second magnetic core made of a second material, wherein the second magnetic core has a second permeability, the first permeability is less than the second permeability, and the second magnetic core is partially disposed between the first assembly and the second assembly; and two windings wound on the two winding pillars of the first magnetic core respectively, wherein when the current flows through the two windings, a closed magnetic path is generated in the first magnetic core, the magnetic flux generated by the closed magnetic path flows through one of the winding pillars, one of the connecting parts, the other one of the winding pillars and the other one of the connecting parts in a direction, and the magnetic fluxes generated on the second magnetic core are cancelled out by each other;

wherein the first material contains an alloy material, and the second material contains a ferrite material.

2. The magnetic element according to claim 1, wherein the second magnetic core is an I-type magnetic core.

3. The magnetic element according to claim 1, wherein the second magnetic core is an U-type magnetic core.

4. The magnetic element according to claim 3, wherein the second magnetic core has a first section, a second section and a third section, the first section and the second section are oppositely disposed, the third section is connected between the first section and the second section, and the second magnetic core is assembled to the first magnetic core through the first section and the second section.

5. The magnetic element according to claim 4, wherein the first section has a top side and a bottom side opposite to each other, the second section has a top side and a bottom side opposite to each other, the top side of the first section and the top side of the second section are assembled to a first protruding part and a second protruding part of the first assembly respectively, the bottom side of the first section and the bottom side of the second section are assembled to a first protruding part and a second protruding part of the second assembly respectively, and at least a part of the two windings is disposed in a space formed between the first section, the second section and the third section.

6. The magnetic element according to claim 1, wherein the first magnetic core is a square-type magnetic core, and the second magnetic core is a U-type magnetic core.

7. The magnetic element according to claim 6, wherein the first magnetic core has a first surface, the second magnetic core is disposed on the first surface, the two windings are partially disposed between the first magnetic core and the second magnetic core, the second magnetic core has a first section, a second section and a third section, the first section and the second section are oppositely disposed, the third section is connected between the first section and the second section, and the first section and the second section are assembled to the two connecting parts of the first magnetic core respectively.

8. The magnetic element according to claim 6, wherein the first magnetic core is composed of a U-type magnetic core and an I-type magnetic core.

9. The magnetic element according to claim 6, wherein the first magnetic core is composed of two U-type magnetic cores.

10. The magnetic element according to claim 1, wherein the magnetic element corresponds to two inductors of the interleaved parallel circuit, and switching timings between switches corresponding to the two inductors have a phase difference of 180 degrees.

* * * * *